Patented Aug. 21, 1923.

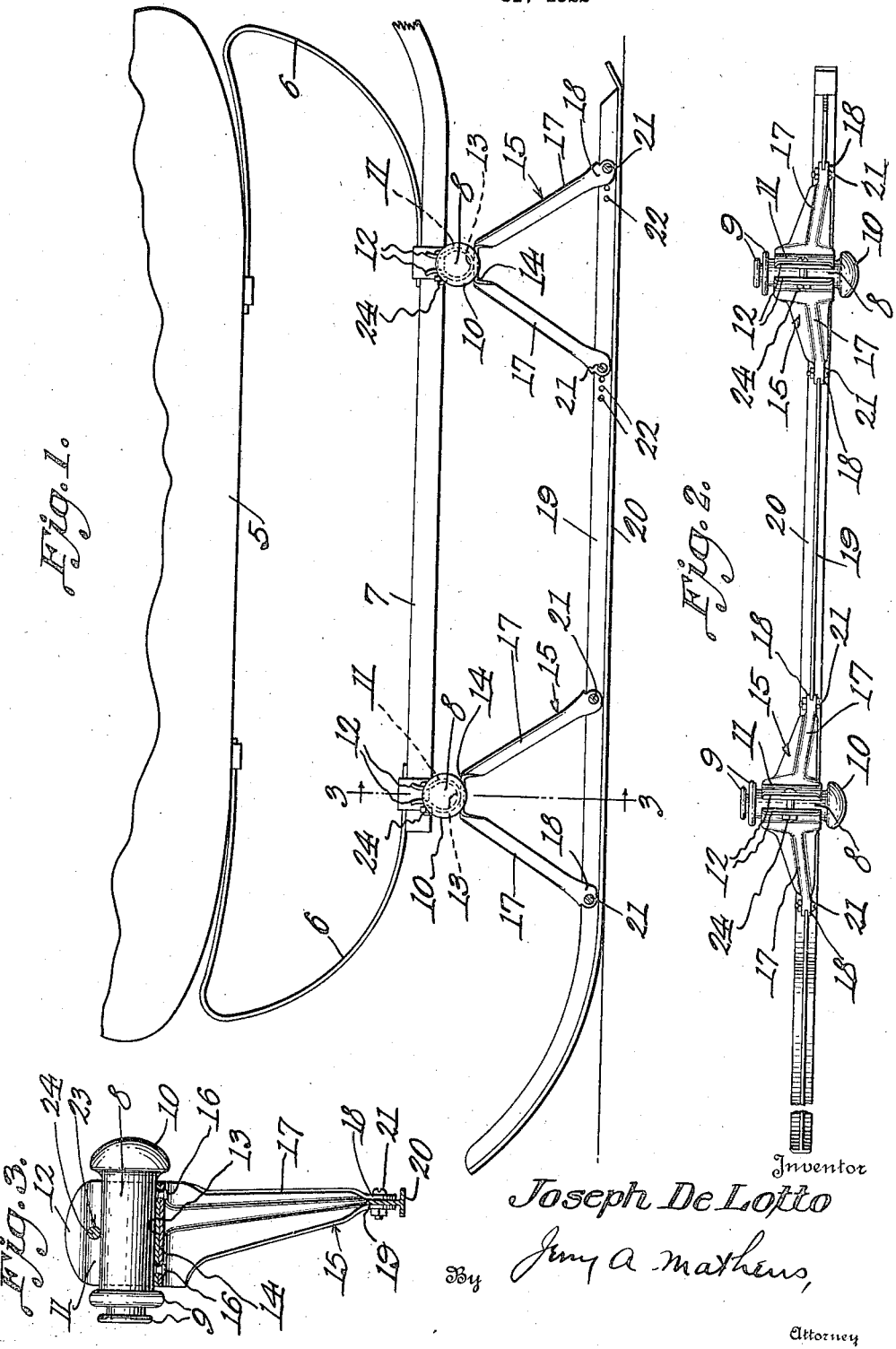

1,465,463

UNITED STATES PATENT OFFICE.

JOSEPH DE LOTTO, OF CLEVELAND, OHIO.

RUNNER ATTACHMENT.

Application filed October 31, 1922. Serial No. 598,169.

*To all whom it may concern:*

Be it known that I, JOSEPH DE LOTTO, a citizen of the United States, residing at Cleveland, in the county of Cuyahoga and State of Ohio, have invented certain new and useful Improvements in Runner Attachments, of which the following is a specification.

My invention relates to runner attachments, adapted for use in connection with baby carriages or the like, while not necessarily restricted to that use.

An important object of the invention is to provide a runner attachment of the above mentioned character, which is extremely simple in construction, cheap to manufacture, strong, durable, and easy and convenient to apply to the baby carriage or like vehicle.

Other objects and advantages of the invention will be apparent during the course of the following description.

In the accompanying drawings forming a part of this specification and in which like numerals are employed to designate like parts throughout the same, Figure 1 is a side elevation of a runner attachment embodying my invention, Figure 2 is a plan view of the same, and, Figure 3 is a transverse section taken on line 3—3 of Figure 1.

In the drawings, wherein for the purpose of illustration is shown a preferred embodiment of my invention, the numeral 5 designates the body of a baby carriage, mounted upon springs 6, secured to the frame 7, which carries the axles, as is usual.

The numeral 8 designates tubular hub members, which are substituted for the usual hubs of the carriage wheels. These tubular hub members are mounted upon the spindles of the axles, and are held thereon by the usual forked clip, projected between flanges 9, formed upon the inner end of the tubular hub member. The tubular hub member 8 is provided at its outer end with a flange 10, as shown.

The numeral 11 designates U-shaped suitably resilient and stiff sockets, which are substantially U-shaped in cross section with their upper ends diverging slightly, as shown at 12. These sockets have their transverse bottom portions 13 resting upon transverse portions 14, of inverted substantially V-shaped brackets 15. The bottom 13 is rigidly secured to the transverse portion 14 by rivets 16. Particular attention is called to the fact that by virtue of the U-shape of the socket 12, it may be conveniently mounted upon the transverse portion 14 and riveted thereon. This affords a strong connection, and one which may be produced cheaply. Each bracket 15 is preferably formed of stiff sheet metal. The bracket embodies spaced downwardly diverging legs 17, integral with the transverse portion 14. These legs are approximately V-shaped in cross section, which renders the same very stiff and rigid. The lower ends of the legs have their sides pressed together, providing apertured ears 18, adapted to straddle a flange 19, formed upon a runner 20. The ears 18 are clamped to the flange 19 by bolts 21 or the like. The bolts 21 of one set of brackets 15 are adapted to be passed through selected openings 22, which are spaced, for the purpose of affording proper adjustment. The connection between the bracket and runner is strong and rigid.

The sides of the U-shaped socket are provided with openings 23, for receiving bolts 24, as shown.

In the use of the device, the bolts 24 are removed, and the tubular hub members 10 may be forced downwardly between the diverging ends 12 of the sockets 11. The sides of the sockets will yield outwardly until the tubular hub member is positioned therein, subsequently to which the sides of the socket will spring inwardly. It is thus seen that the tubular hub member is positioned within the U-shaped socket by a downward movement with relation thereto. When the hub members are thus inserted within the U-shaped sockets, the bolts 23 are passed through the openings 24 and their nuts screwed up, for effecting a clamping engagement between the sides of the sockets and the tubular hub members 10. The wheels may be removed from the carriage and the tubular hub members 10 inserted upon the spindles of the axles.

It is to be understood that the form of my invention herewith shown and described is to be taken as a preferred embodiment of my invention, and that various changes in the size, shape, and arrangement of parts may be resorted to without departing from the spirit of my invention or the scope of the subjoined claims.

Having thus described my invention, I claim:

1. A runner attachment for baby carriages or the like, comprising a runner having a longitudinal reinforcing flange, inverted approximately V-shaped brackets, each bracket being formed of sheet metal and having an upper transverse portion and downwardly diverging legs, said legs being substantially V-shaped in cross-section and provided at their lower ends with apertured ears adapted to be arranged upon opposite sides of the reinforcing flange of the runner, bolts passing through the apertured ears and the flange, and substantially U-shaped resilient sockets having their upper ends open and their transverse bottoms arranged upon the upper transverse portions of said brackets and riveted thereto, tubular hub members adapted for insertion within the U-shaped sockets by a downward movement with relation thereto, and means to draw the sides of each U-shaped socket inwardly toward each other.

2. A runner attachment for baby carriages or the like, comprising a runner having a reinforcing flange, inverted approximately V-shaped brackets, each bracket being formed of sheet metal and having an upper transverse portion and downwardly diverging legs, said legs being substantially V-shaped in cross-section and provided at their lower ends with apertured ears adapted to be arranged upon opposite sides of the reinforcing flange of the runner, means connecting the apertured ears and said flange, substantially U-shaped resilient sockets having their upper ends open and their transverse bottoms arranged upon the upper transverse portions of said brackets and riveted thereto.

In testimony whereof I affix my signature.

JOSEPH DE LOTTO.